Figure 1:
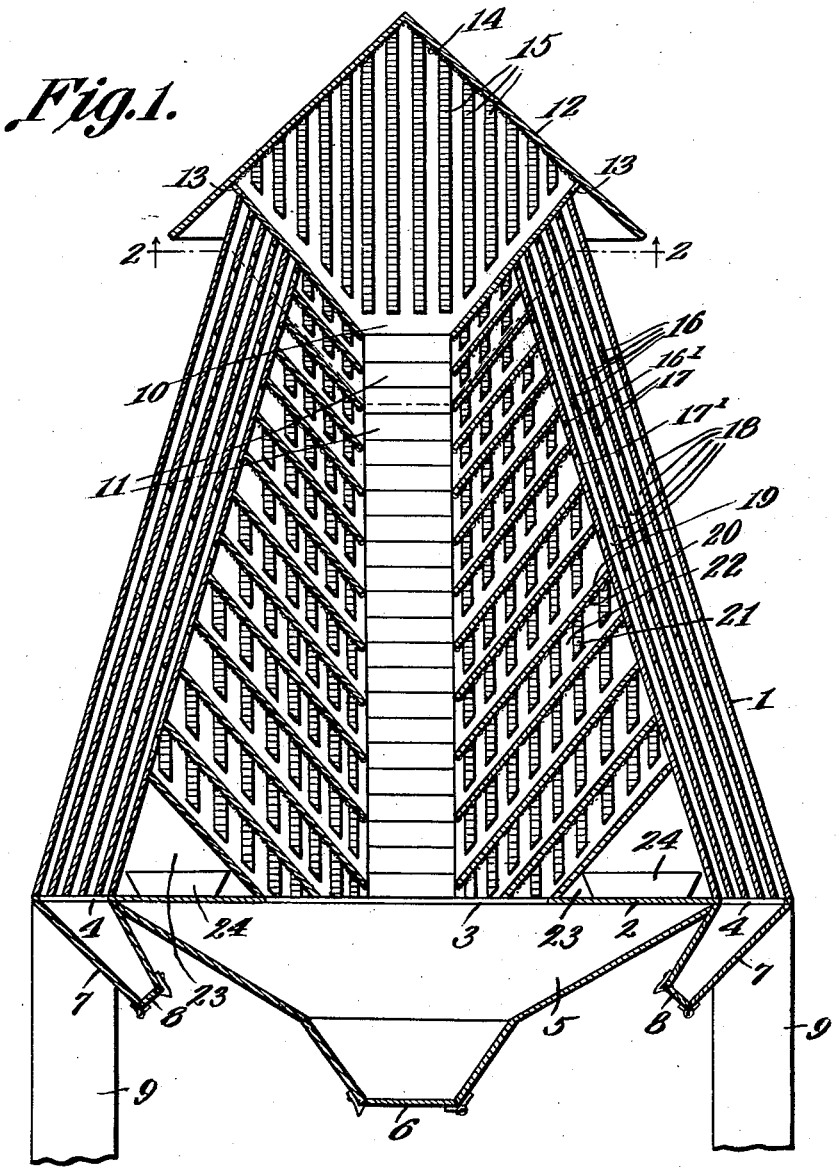

C. A. R. CAMPBELL.
BAT ROOST.
APPLICATION FILED MAY 13, 1913.

1,083,318.

Patented Jan. 6, 1914.
2 SHEETS—SHEET 1.

Charles A. R. Campbell,
Inventor

Witnesses by
Attorneys

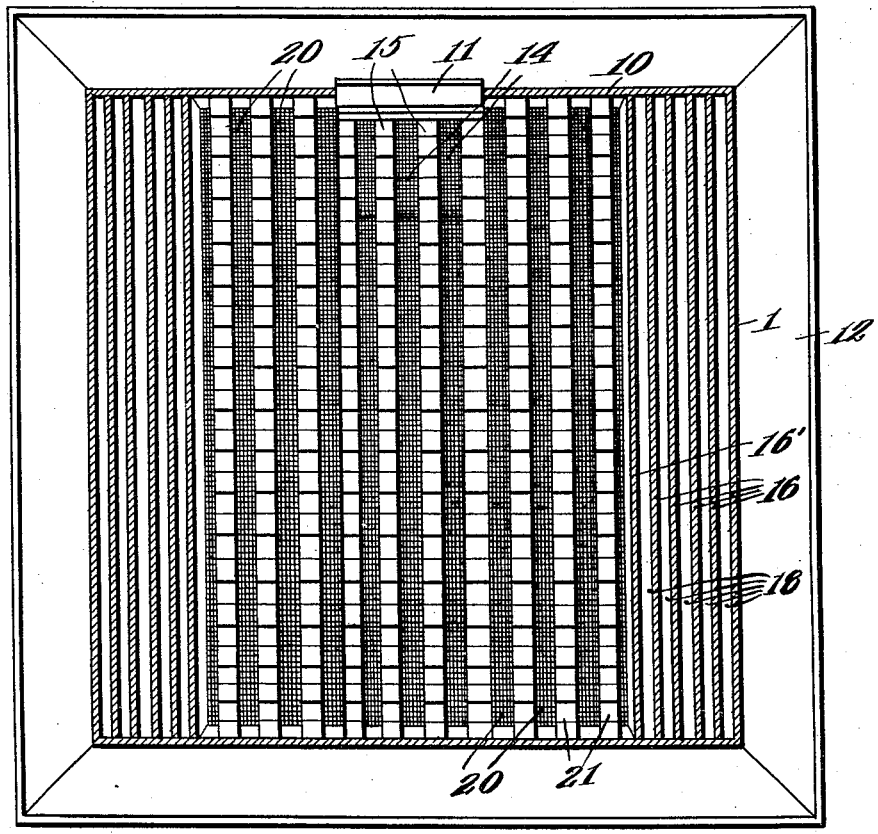
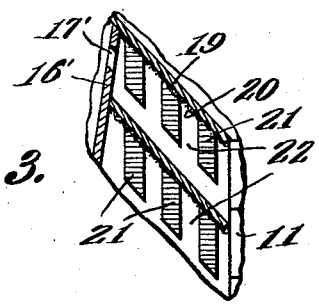
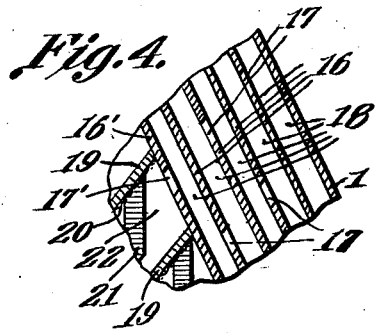

UNITED STATES PATENT OFFICE.

CHARLES A. R. CAMPBELL, OF SAN ANTONIO, TEXAS.

BAT-ROOST.

1,083,318.   Specification of Letters Patent.   Patented Jan. 6, 1914.

Application filed May 13, 1913. Serial No. 767,421.

*To all whom it may concern:*

Be it known that I, CHARLES A. R. CAMPBELL, a citizen of the United States, residing at San Antonio, in the county of Bexar and State of Texas, have invented a new and useful Bat-Roost, of which the following is a specification.

The present invention relates to improvements in bat roosts, one object of the invention being the provision of a novel construction of an apparatus of this character, in which there is provided proper roosting portions as well as hibernating spaces for the bats, the lower outlets of all being directed into respective hoppers for the accumulation of the droppings, whereby the same may be readily gathered at desired intervals.

A further object of the present invention is the provision of a space within the roost, whereby receptacles containing sulfuric acid may be disposed, to absorb from the atmosphere the free ammonia, so that the same will not be lost.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a vertical sectional view through the complete roost. Fig. 2 is a section taken on line 2—2 of Fig. 1. Fig. 3 is an enlarged detail view of a portion of the inclined roosting partition. Fig. 4 is an enlarged detail view of a portion of one of the hibernating compartments.

Referring to the drawings, the numeral 1 designates the housing which is preferably made as a truncated pyramid, with a cover 12, the floor 2 being provided with and having the central aperture 3 and the two oppositely disposed apertures 4, having outlet into the main hopper or receptacle 5 disposed below the housing, said hopper being provided with the hinged bottom 6, whereby the droppings contained therein may be gathered at intervals. Disposed at the respective outlets 4, are the auxiliary receptacles or hoppers 7, having the controlling doors 8. The complete roost is properly supported upon a super-structure, the same being of such a height above the ground, as to permit the passage below the respective hoppers 5 and 7 of a wagon or other means for receiving the droppings.

In one wall 10 of the roost, is provided vertically and centrally thereof, the blind or slatted inlet portion 11, which provides a means for free ingress and egress of the bats, yet at the same time prevents or excludes to a great degree the light rays, so that the interior of the roost will be darkened at all times, as is necessary for the proper housing and breeding of bats.

A cover 12 of any desired shape is provided for the housing, so as to prevent the admission of rain or snow into the roost, while at the upper end of the two opposed walls as at 13, are provided the openings, which provide means for free ingress and egress of the bats at such point and below the eaves of the roof.

Secured to the under side of the roof, as clearly illustrated in Fig. 1, is a screen 14, which provides a ready means for the hanging of the bats, that desire to roost at the extreme top of the housing, while depending therefrom are the vertical partitions 15, which provide a means for dividing the space into a plurality of vertical compartments, so that the various families of bats will be properly separated and thus prevented from fighting and annoying each other.

Disposed parallel to the two opposite walls of the housing within the same, are the inclined partitions 16, intermediate of the outer wall and the inner partition 16', such partitions 16 being provided with the apertures 17 to permit of the free passage of the bats into and out of the hibernating spaces 18, there being shown in the present instance, five such spaces at each side of the roost. The partition 16' is provided with the opening 17', which form the ports of ingress and egress for the breeding bats. It will be noted that partitions 16 are inclined downwardly, and provide open spaces at their lower ends, so that the accumulations or droppings will be directed downwardly into the respective auxiliary hoppers 7.

Attached to and depending downwardly and inwardly from the partitions 16', to a point adjacent the respective edges of the slatted portion 11 of the roost, are the shelves 19 which provide roosting compartments therebetween, the under side of the shelves, as clearly shown in Fig. 3, being provided with the wire netting 20 and the depending aprons 21, which provide the roosting compartments 22 therebetween with their outlets disposed to permit of the droppings falling upon the upper surface of the adjacent shelves 19, as the same are directed to the vertical space in line with the slatted opening 11, the same falling directly into the main hopper 5.

Below the lowermost shelf 19 is provided the dead space 23, in which is placed the receptacle 24 containing sulfuric acid. By this means, the free ammonia will be properly collected and can be removed at desired intervals through openings formed in the walls of the roosts adjacent such dead spaces 23.

From the foregoing description, taken in connection with the drawings, it is evident that a bat roost constructed according to and embodying the present invention, provides a means for the hibernating bats, so that the same will be properly separated from the non-hibernating ones, thus providing every available space for roosting and for breeding purposes, while all spaces will outlet into the respective hoppers 5 and 7 at the bottom, so that the accumulations will be properly directed thereto to be collected at desired intervals.

What is claimed is:

1. A bat roost, including a structure having a centrally disposed roosting compartment and two oppositely disposed downwardly and outwardly inclined hibernating compartments, such compartments being open at their lower ends, and hoppers disposed at the lower end of such roosting and hibernating compartments.

2. A bat roost, including a structure having a centrally disposed roosting compartment and two oppositely disposed downwardly and outwardly inclined hibernating compartments, such compartments being open at their lower ends, and hoppers disposed at the lower end of such roosting and hibernating compartments, said structure being provided with ports of egress and ingress at the upper end thereof and in one wall centrally thereof throughout the length of the structure.

3. A bat roost, including a structure, the walls of which incline downwardly from the top thereof, a cover fitting upon the top and forming adjacent the walls, ports of ingress and egress, a plurality of perforated partitions disposed in spaced relation adjacent two walls thereof and forming a plurality of hibernating compartments open at their lower ends, and a hopper disposed at the open ends of the hibernating compartments.

4. A bat roost, including a structure, the walls of which incline downwardly from the top thereof, a cover fitting upon the top and forming adjacent the walls ports of ingress and egress, a plurality of perforated partitions disposed in spaced relation adjacent the two walls thereof and forming a plurality of hibernating compartments open at their lower ends, and a hopper disposed at the open ends of the hibernating compartments, the portion between the hibernating compartments constituting a roosting compartment.

5. A bat roost, including a structure, the walls of which incline downwardly from the top thereof, a cover fitting upon the top and forming adjacent the walls ports of ingress and egress, a plurality of perforated partitions disposed in spaced relation adjacent the two walls thereof and forming a plurality of hibernating compartments open at their lower ends, a hopper disposed at the open ends of the hibernating compartments, a plurality of shelves extending from the inner shelves of the hibernating compartments toward the center of the structure and inclining downwardly, the inner ends of the same providing spaces open toward the center of the structure, and a main hopper disposed at the bottom of the structure.

6. A bat roost, including a structure, the walls of which incline downwardly from the top thereof, a cover fitting upon the top and forming adjacent the walls ports of ingress and egress, a plurality of perforated partitions disposed in spaced relation adjacent the two walls thereof and forming a plurality of hibernating compartments open at their lower ends, a hopper disposed at the open ends of the hibernating compartments, a plurality of shelves extending from the inner shelves of the hibernating compartments toward the center of the structure and inclining downwardly, the inner ends of the same providing spaces open toward the center of the structure, a main hopper disposed at the bottom of the structure, and an inclosed space adjacent the lower end of the hopper at each side thereof for containing sulfuric acid receptacles.

In testimony that I claim the foregoing as my own, I have hereto affixed my signature in the presence of two witnesses.

CHARLES A. R. CAMPBELL.

Witnesses:
E. A. HERTBURG,
HERMANN DREISS.